May 20, 1930. F. M. DUNN 1,759,607
GARDEN IMPLEMENT
Filed Sept. 15, 1927
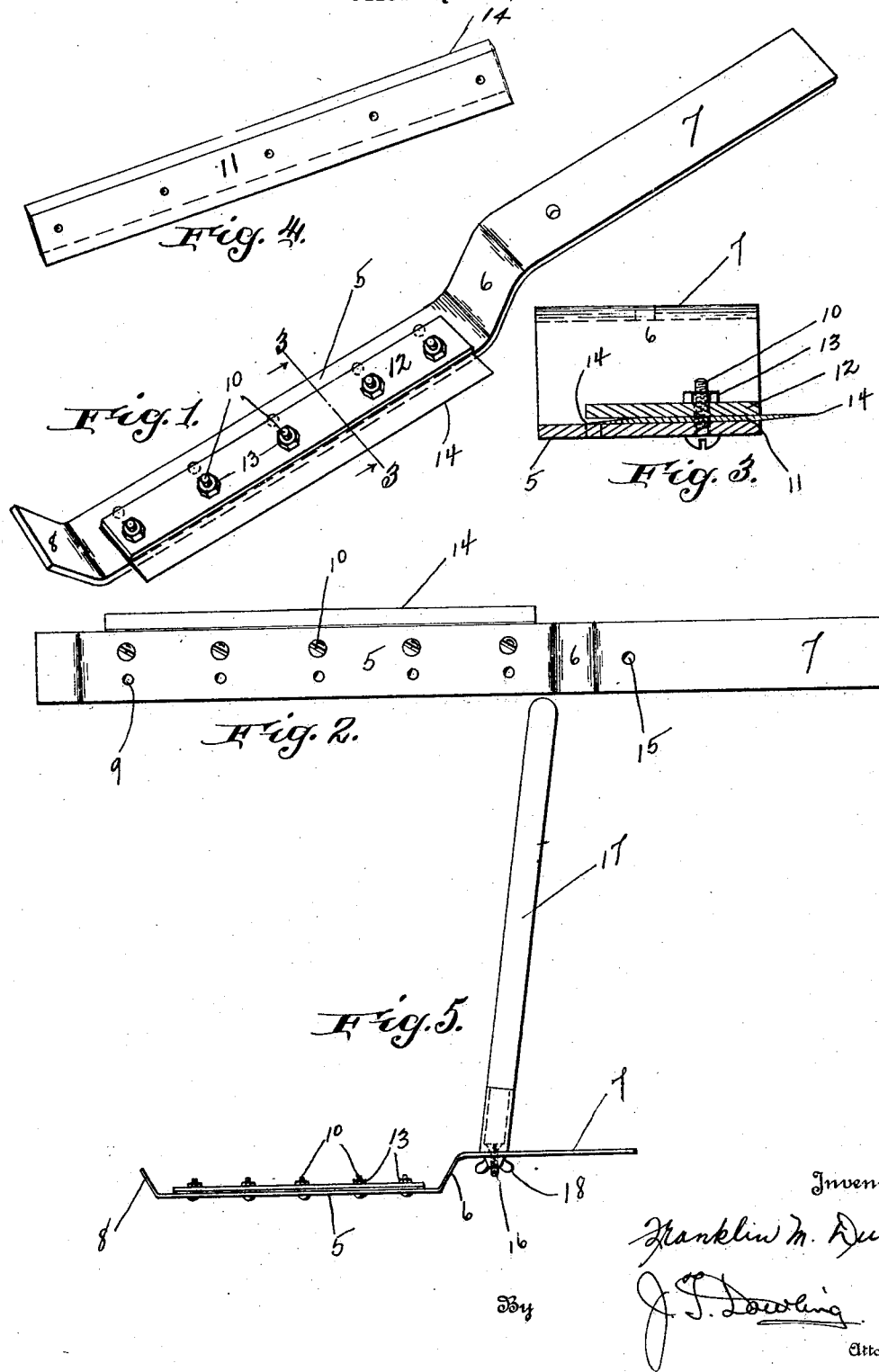
Inventor
Franklin M. Dunn
By J. T. Dowling
Attorney Patented May 20, 1930

1,759,607

UNITED STATES PATENT OFFICE

FRANKLIN M. DUNN, OF OVERLEA, MARYLAND

GARDEN IMPLEMENT

Application filed September 15, 1927. Serial No. 219,604.

This invention relates to certain new and useful improvements in garden implements and has for its particular object the provision of an implement for the purpose of cutting grass, weeds, or the like, and it embodies a shank having a handle and secured to the shank is a reversible cutting blade.

A further object of the invention is the provision of a cutting implement stamped from a single blank of metal and equipped with a detachable blade having its opposite side edges defining cutting portions so that said implement can be used either in the right or left hand.

A still further object of the invention is the provision of a cutting implement of the class described, embodying a shank and handle stamped from a single blank and equipped with a cutting blade detachably secured to the shank and so arranged that its cutting surface may project from either side longitudinal edge of the shank.

A further object of this invention is the provision of a garden implement that can be manufactured and sold at a comparatively small cost.

With these and other objects in view, the invention consists in certain novel features, combination and arrangement of parts as will be hereinafter more fully described, illustrated in the accompanying drawing, and claimed.

In the drawing,

Figure 1 is a perspective view of my improved garden implement, as made in accordance with this invention;

Figure 2 is a top plan view of the implement;

Figure 3 is a transverse sectional view taken on the line 3—3 of Figure 1;

Figure 4 is a perspective view of the double edged cutting blade; and,

Figure 5 is a side elevational view of my improved garden implement, illustrating a handle attachment therefor.

Referring to the drawing, the numeral 5 indicates the flat shank of a garden implement having one end offset as at 6, to provide an extension 7, constituting a handle. The opposite end of the shank is curved upwardly and outwardly to provide a guard 8, and this shank, handle, and guard are all struck from a single blank of material, so as to reduce the cost of manufacture to a minimum.

The shank is provided adjacent each side longitudinal edge with relatively spaced openings 9, which openings are adapted to receive the fastening elements 10 for securing the cutting blade 11 to said shank.

To assist in retaining the cutting blade 11 in position on the shank 5, there is detachably secured thereto a binder plate 12, and this binder plate is detachably held in engagement with the blade and to the shank 5 by virtue of the nuts 13.

The blade 11 has its opposite side longitudinal edges beveled to define cutting edges 14, and by virtue of the cutting edges 14 being on each side of the blade 11, it permits said blade to be reversibly secured to the shank 5, by virtue of the fastening means 10 and 13.

It will be clear from the drawing, particularly Figure 1, that one cutting edge 14 of the blade extends beyond the left hand longitudinal side edge of the shank 5, this permitting the implement to be used by a right handed person when cutting.

To facilitate means whereby the implement can be used in the left hand, it will be only necessary to remove the fastening means 10 from the present set of openings, shift the blade over to the right hand longitudinal side edge of the shank, insert the fastening elements 10 in their respective openings, and fasten the blade in the manner previously described.

The guard 8 of the shank is arranged to permit cutting at close quarters, as around flower beds, hedges, curbs, or the like.

The principal feature embodied in this invention is the simplicity and cheapness in manufacture, and when assembled is light and durable and positive in operation.

The handle portion 7 is provided with an opening 15, in which is secured the fastening element 16 of a vertical handle 17, and this fastening element 16 is secured to the handle 7 by virtue of a wing nut 18. It will be readily understood that by virtue of the handle 17 that an operator of this device can stand approximately in vertical position and eliminate the necessity of stooping down or bending over in a crouched position to use the implement.

Having thus described my invention, what I claim as new is:

A cutting implement of the class described, including a shank having one end bent laterally at right angles thereto, to form a guard, and its opposite end offset to provide an extension constituting a handle, said shank, guard, and handle stamped from a single blank of material, said shank provided with openings, and means extending through said openings for detachably securing a cutting blade to either longitudinal side edge of said shank, and means to retain said blade in positive position on said shank.

In testimony whereof he hereunto affixes his signature.

FRANKLIN M. DUNN.